3,469,007
INHIBITION OF EGG PRODUCTION IN PIGEONS
George E. Short, Arlington Heights, Ill., assignor to G. D. Searle & Co., Chicago, Ill., a corporation of Delaware
No Drawing. Filed Mar. 18, 1964, Ser. No. 352,949
Int. Cl. A61k 17/00
U.S. Cl. 424—238                                       4 Claims

ABSTRACT OF THE DISCLOSURE

Compositions containing 20 - [(3 - dimethylamino)propyl]pregn-5-en-3β-ol or a non-toxic acid addition salt thereof and methods for administering those compositions to pigeons for the purpose of inhibiting egg production.

---

The present invention is concerned with novel compositions and novel processes useful for the purpose of inhibiting egg production in birds.

The inhibition of egg production in birds can be utilized for a variety of objectives. In those species of value as a source of food, such as chickens and turkeys, interference with the development of the ova liberates nutrients which can be utilized by the organism to increase body weight. Another valuable aspect of the present invention is the availability of a method whereby the population of birds can be controlled and, in the case of those species constituting a public nuisance, can be eliminated completely. Examples of such species are pigeons and starlings.

Previous methods available for control of bird population suffer from the disadvantage that the animals themselves are harmed. The process of the present invention, however, involves the administration, in the normal diet, of a highly potent hypocholesterolemic agent, thus inhibiting egg production, apparently by the mechanism of interference with development of the ova. The particular highly potent hypocholesterolemic agents of this invention are 20-[(3-dimethylamino)propyl]pregn-5-en-3β-ol and its non-toxic acid addition salts characterized by the structural formula

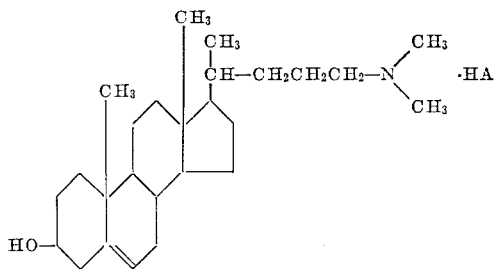

wherein HA represents such non-toxic acids as sulfuric, hydrochloric, hydrobromic, phosphoric, citric, maleic, tartaric, ascorbic, gluconic, lactic, and succinic. A particularly preferred salt is the hydrochloride in view of its ready water solubility.

The novel compositions of this invention can be conveniently obtained by dissolving the aforementioned hypocholesterolemic agent in a suitable solvent such as water, ethyl alcohol, or aqueous propylene glycol, and mixing that solution with bird feed. In the case of a volatile solvent, evaporation of the solvent affords a coating of the desired inhibitor on the feed. For the purpose of inhibiting ova development in domestic fowl such as chickens and turkeys, the addition of 0.5 mg.–2 mg./lb. of feed of 20 - [(3-dimethylamino)propyl]pregn-5-en-3β-ol hydrochloride is effective. A dosage of 1 mg./lb. of feed (0.0001%) is especially preferred. A somewhat higher dosage is required for the purpose of eliminating egg production in nuisance birds such as pigeons. The administration of 50–300 mg./lb. of feed is suitable for that purpose, and a dosage of 100 mg./lb. of feed (0.02%) is particularly preferred.

The following example describes a process for the preparation of a composition of the present invention, which is equally suitable for administration to wild and domestic fowl:

One lb. of a suitable ration is thoroughly mixed with a solution of 100 mg. of 20-[(3-dimethylamino)propyl]pregn-5-en-3β-ol hydrochloride in 10 cc. of water or 10 cc. of a 50% aqueous propylene glycol mixture. A suitable ration is illustrated in the following table:

| | | |
|---|---|---|
| Ground wheat | lb | 300 |
| Ground yellow corn | lb | 550 |
| Ground barley | lb | 200 |
| Pulverized oats | lb | 200 |
| Tallow or grease (stabilized) | lb | 25 |
| Dehydrated alfalfa | lb | 80 |
| Meat meal (50% protein) | lb | 50 |
| Fish meal (65% protein) | lb | 50 |
| Dried buttermilk or skimmed milk | lb | 50 |
| Soy bean oil meal (44% protein) | lb | 380 |
| Ground limestone | lb | 60 |
| Dicalcium phosphate | lb | 30 |
| Iodized salt | lb | 20 |
| Vitamin A supplement (10,000 I.U./gram) | lb | 1.5 |
| Vitamin $D_3$ supplement (1500 I.C.U./gram) | lb | 2 |
| Diphenyl-p-phenylene-diamine (DPPD) | lb | 0.125 |
| Manganese sulfate | lb | 0.5 |
| Riboflavin | g | 2 |
| Antibiotic | g | 4–20 |
| Vitamin $B_{12}$ | mg | 3 |

An alternate procedure, particularly valuable in the treatment of nuisance birds, involves the coating of whole, cracked, crushed, or rolled grains with the hypocholesterolemic agent. Grains suitable for this purpose are wheat, barley, whole or cracked corn and whole or rolled oats. It is apparent that administration of the active agent by this method is advantageous from an economic standpoint. The aforementioned aqueous or aqueous propylene glycol solution of 20-[(3-dimethylamino)propyl]pregn-5-en-3β-ol hydrochloride (100 mg./10 cc.) can be utilized also in this process. After soaking of the whole, cracked, crushed, or rolled grain in that solution, the solvent is evaporated by appropriate means to afford the coated feed.

In areas where food sources for nuisance birds may be fairly abundant while drinking water is relatively scarce, it is advantageous to administer the highly potent agents of the present invention in the form of an aqueous solution. In view of the relatively larger water intake of those birds as compared to their solid diet, a lower concentration of the hypocholesterolemic agent can be used. An effective concentration of 20-[(3-dimethylamino)propyl]pregn-5-en-3β-ol hydrochloride, for example, is 120–800 mg./gallon of water with the preferred concentration being about 240 mg./gallon of water.

The foregoing illustrative examples describe in detail certain of the compositions which constitute this invention together with methods for their preparation. The invention, however, is not to be construed as limited thereby either in spirit or in scope as many modifications both in materials and methods can be adapted without departing from the invention herein described.

What is claimed is:

1. A process for inhibiting egg production which comprises orally administering to pigeons an egg-inhibiting amount of a compound selected from the group consisting of 20-[(3-dimethylamino)propyl]pregn-5-en-3β-ol and its non-toxic acid addition salts.

2. The process of claim 1 wherein the compound is 20 - [(3-dimethylamino)propyl]pregn-5-en-3β-ol hydrochloride.

3. A composition for inhibiting egg production which comprises a pigeon feed containing an egg-inhibiting amount of a compound selected from the group consisting of 20-[(3-dimethylamino)propyl]pregn-5-en-3β-ol and its non-toxic acid addition salts.

4. The composition of claim 3 wherein the compound is 20 - [(3-dimethylamino)propyl]pregn-5-en-3β-ol hydrochloride.

References Cited

UNITED STATES PATENTS 3,144,471   8/1964   Nelson _____ 260—397.5

FRANK CACCIAPAGLIA, JR., Primary Examiner